No. 672,132. Patented Apr. 16, 1901.
B. C. MORGAN & H. H. MAIN, Jr.
NUT LOCK.
(Application filed Oct. 15, 1900.)
(No Model.)

Witnesses
Fred E. Maynard.

Bennett C. Morgan and
Harry H. Main, Jr. Inventors
By C. A. Snow & Co.
Attorneys

THE NORRIS PETERS CO., PHOTO-LITHO., WASHINGTON, D. C.

UNITED STATES PATENT OFFICE.

BENNETT C. MORGAN AND HARRY H. MAIN, JR., OF SAN JOSE, CALIFORNIA.

NUT-LOCK.

SPECIFICATION forming part of Letters Patent No. 672,132, dated April 16, 1901.

Application filed October 15, 1900. Serial No. 33,143. (No model.)

*To all whom it may concern:*

Be it known that we, BENNETT C. MORGAN and HARRY H. MAIN, Jr., citizens of the United States, residing at San Jose, in the county of Santa Clara and State of California, have invented a new and useful Nut-Lock, of which the following is a specification.

This invention relates to nut-locks, and has for its object to provide an improved device of this character in which the nut may be conveniently and effectively locked against accidental displacement, and also conveniently removed and replaced without damaging either the nut or the bolt. It is furthermore designed to provide for expanding the bolt so as to lock the nut thereon and to conveniently contract the bolt for removing the nut therefrom; also, to maintain the bolt in a normally-contracted condition and free from lateral projections in order that it may be conveniently thrust through a bolt-opening and in condition for the reception of a nut.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
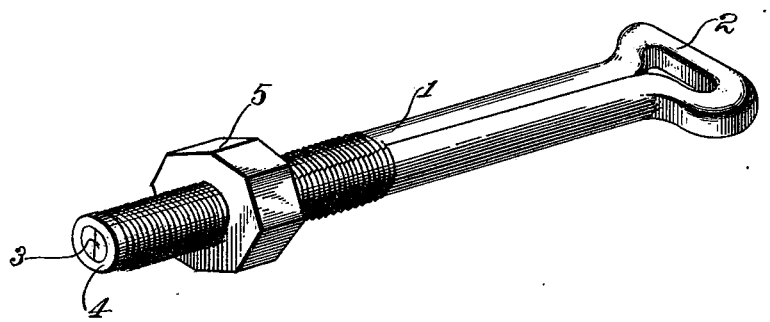
Figure 2:
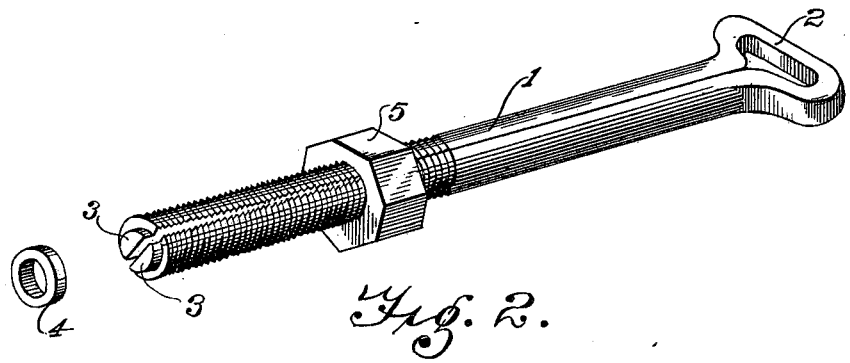

In the drawings, Figure 1 is a perspective view of a bolt constructed in accordance with the present invention and arranged for applying and removing a nut therefrom. Fig. 2 is a similar view showing a nut locked upon the bolt.

Corresponding parts are designated by like characters of reference in both figures of the drawings.

Referring to the drawings, 1 designates a bolt, which is formed from a strip of half-round metal, which is bent intermediate of its ends so as to form the eye or head 2, while the greater portions of its opposite flat sides are brought together, so as to form a cylindrical bolt. The convex sides of the metal strip are similarly screw-threaded, so that when the bolt is completed the screw-threads will correspond and be continuous for the entire length of the screw-threaded portion. The opposite extremities of the strip are reduced, so as to form the segmental projections or shoulders 3, which are duplicates and form a single cylindrical reduced projection at the end of the bolt when the latter is completed. After the strip of half-round metal has been bent into the form of a bolt the latter is heated, and a wedge-like implement is driven longitudinally between the opposite sections of the belt, so as to separate the same and form opposite spring-sections, thereby producing an expansible bolt. A clamping device, such as a ring or collar 4, is then fitted to the terminal projections of the bolt, so as to draw the sections tightly together in order that the bolt may be of the same diameter throughout the screw-threaded portion thereof and to receive an ordinary nut 5, which is screwed upon the bolt in the usual manner. It will be observed that the bolt-contracting collar lies within the circular periphery of the bolt, whereby the latter is free from lateral projections in order that it may be conveniently thrust through a bolt-opening and maintained in condition for the reception of a nut.

To lock the nut upon the bolt, it is merely necessary to remove the clamping ring or collar 4, thereby releasing the spring-sections of the bolt, which will spring apart as indicated in Fig. 2 of the drawings, thereby binding the threads of the bolt upon the threads of the nut and holding the latter against accidental displacement. However, the tension of the spring-sections is not sufficient to prevent the nut from being removed by forcibly turning the nut in a reverse direction. The contracting device normally remains on the bolt until the nut has been applied to its set position for use and is removed only after the nut has been thus applied.

It will be understood that the present device is a complete article, as the ring or collar 4 is applied in the original manufacture of the bolt, the jaws being drawn together by means of a suitable clamping implement having its jaws faced with copper or some soft material which will not damage the screw-threads of the bolt.

What is claimed is—

1. A new article of manufacture, consisting of a normally-contracted laterally-expansible bolt, having a nut fitted thereon, and a separate detachable bolt-contracting device normally carried by the bolt, said device being removed and the bolt expanded only when the nut has been set for use upon the bolt.

2. A new article of manufacture, consisting of a bolt, having its screw-threaded end split longitudinally and forming opposite laterally-expansible longitudinal spring-sections, a nut fitted to the bolt, and a detachable terminal bolt-contracting device carried by the outer ends of the sections when the bolt is not in use, and which is removed only when the nut has been applied to its set position.

3. A nut-lock comprising a bolt having longitudinal spring-sections, a removable clamping-collar normally holding the sections together, and a nut fitted to the spring-sections.

4. A nut-lock comprising a bolt having longitudinal spring-sections, the outer ends of which are provided with corresponding reduced projections, a clamping-collar removably embracing the projections and normally holding the spring-sections together, and a nut fitted to the spring-sections of the bolt.

5. A bolt, formed from a single strip of half-round metal, having the convex sides of its opposite end portions provided with corresponding screw-threads, and reduced segmental terminal projections, the metal strip being bent intermediate of its ends and having its flat faces brought into contact and then separated slightly to form spring-sections, and a removable collar fitted to the combined terminal projections and normally holding the spring-sections together.

6. A new article of manufacture, consisting of a bolt having its screw-threaded end split longitudinally forming opposite longitudinal sections which are sprung apart forming laterally-expansible sections, a nut fitted to the bolt and a terminal bolt-contracting device carried by the outer ends of the spring-sections, whereby the bolt is normally contracted, said device lying within the circular periphery of the bolt, whereby the bolt is free from lateral projections, the contracting device being removed and the bolt expanded only after the nut has been applied to its set position.

In testimony that we claim the foregoing as our own we have hereto affixed our signatures in the presence of two witnesses.

BENNETT C. MORGAN.
    HARRY H. MAIN, Jr.

Witnesses:
 A. H. JOYNT,
 F. C. SCHERRER.